United States Patent [19]
Otake

[11] Patent Number: 5,389,871
[45] Date of Patent: Feb. 14, 1995

[54] SELF-OSCILLATION TYPE DC-DC CONVERTER

[75] Inventor: Tetushi Otake, Tsurugashima, Japan

[73] Assignee: Toko, Inc., Tokyo, Japan

[21] Appl. No.: 215,036

[22] Filed: Mar. 18, 1994

[30] Foreign Application Priority Data

Mar. 19, 1993 [JP] Japan .................................. 5-83849

[51] Int. Cl.$^6$ .............................................. G05F 1/44
[52] U.S. Cl. .................................... 323/282; 323/351
[58] Field of Search ............... 323/234, 265, 282, 284, 323/290, 349, 351; 363/39, 74, 78, 123

[56] References Cited

U.S. PATENT DOCUMENTS 4,180,852 12/1979 Koizumi et al. ................. 323/282 X
4,242,629 12/1980 Shuey ................................ 323/282 X
5,309,082 5/1994 Payne ................................ 323/282 X Primary Examiner—Steven L. Stephan
Assistant Examiner—Y. Jessica Han

[57] ABSTRACT

In a non-insulated, self-oscillation type DC-DC converter, a first PNP switching transistor (Q1) has the emitter thereof connected to the emitter of a second switching transistor (Q2) of the same conductivity type as the first switching transistor. The base of the first switching transistor (Q1) is connected to the collector of the second switching transistor (Q2). The base of the first switching transistor (Q1) is connected to the base of the second switching transistor (Q2) through a resistor R2. A feedback circuit (4) is connected between the collector of the first switching transistor (Q1) and the base of the second switching transistor (Q2).

9 Claims, 5 Drawing Sheets

SELF-OSCILLATION TYPE DC-DC CONVERTER

BACKGROUND OF THE INVENTION

1. Field of the Invention

The present invention relates to a non-insulated type DC-DC converter circuit, and more particularly it pertains to a self-oscillation type DC-DC converter which is adapted to be of the step-down type and capable of generating self-oscillation by using a choke coil which comprises a single-winding inductance element and includes no feedback winding for self-oscillation.

2. Description of the Prior Art

Figure 8:
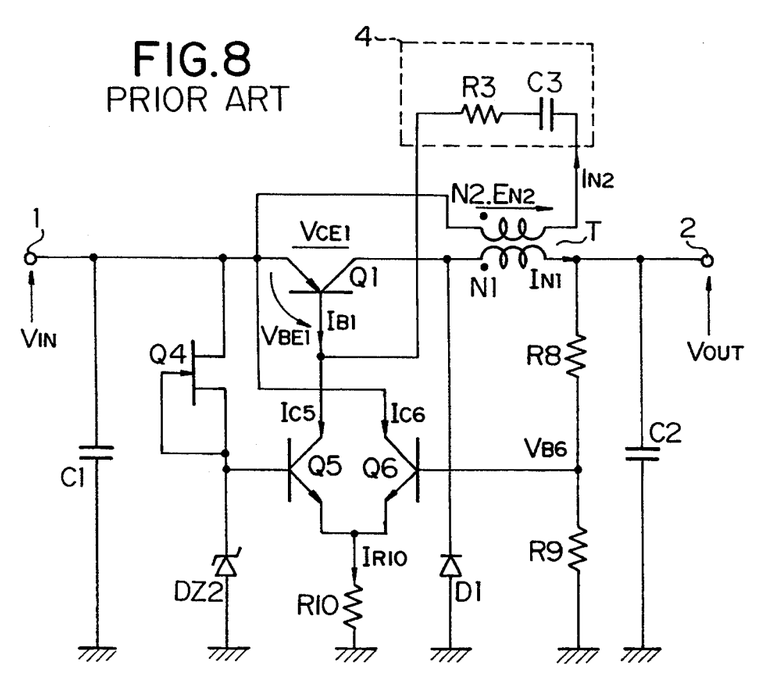
FIG. 8 is a circuit diagram of conventional self-oscillation type DC-DC converter incorporating a choke coil including a feedback winding.

Such a self-oscillation type DC-DC converter has been used as a relatively inexpensive power source because of the fact that the circuit arrangement thereof is simple and comprises only a small number of circuit elements. Referring to FIG. 8 of the accompanying drawings, there is shown a well-known self-oscillation type DC-DC converter circuit.

In the circuit arrangement of FIG. 8, a PNP switching transistor Q1 has its emitter connected to an input terminal 1 and its collector coupled to an output terminal 2 through a main winding N1 of a choke coil T. The emitter of the switching transistor Q1 is also connected to the drain of a field-effect transistor Q4 which has its source connected to its own gate and the cathode of a Zener diode DZ2 which has its anode grounded. The base of the switching transistor Q1 is connected to the collector of an NPN transistor Q5 and one end of a resistor R3.

The base of the transistor Q5 is connected to the cathode of the Zener diode DZ2, and the emitter of the transistor Q5 being grounded through a resistor R10. The other end of the resistor R3 is coupled to one end of a feedback winding N2 of the choke coil T through a capacitor C3. The other end of the feedback winding N2 is connected to the emitter of the switching transistor Q1.

A feedback circuit 4 is constituted by a serial circuit of the resistor R3 and capacitor C3. Further, the arrangement is made such that the end of the main winding N1 of the choke coil T which is connected to the collector of the switching transistor Q1 is of the same polarity as that end of the feedback winding N2 thereof which is connected to the emitter of the switching transistor Q1. A diode D1 is connected between the collector of the switching transistor Q1 and the ground, with the anode thereof grounded. Connected between the output terminal 2 and the ground are a smoothing capacitor C2, and a serial circuit of resistors R8 and R9 in parallel with the smoothing capacitor C2.

An NPN transistor Q6 has the collector thereof connected to the emitter of the switching transistor Q1, the emitter thereof coupled to the emitter of the transistor Q5, and the base thereof tied to the connection point between the resistors R8 and R9.

Figure 9:
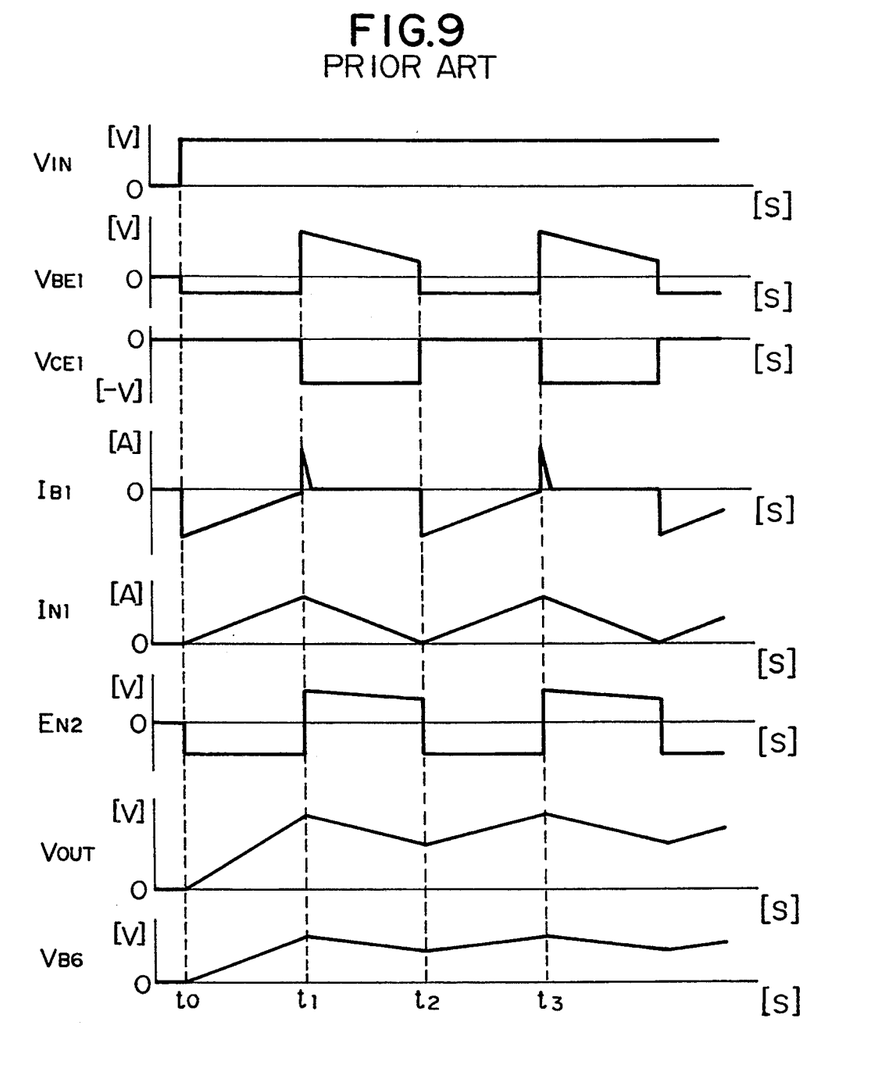
FIG. 9 illustrates current and voltage waveforms which occur at various points in the circuit of FIG. 8.

Description will now be made of the operation of the foregoing DC-DC converter circuit arrangement, with reference to FIG. 9 illustrating current and voltage waveforms which occur at various points in the circuit arrangement.

In FIG. 9, the reference symbols are as follows:

$V_{IN}$ Voltage applied to the input terminal 1;

$V_{BE1}$ Bias voltage applied between the base and the emitter of the switching transistor Q1;

$V_{CE1}$ Voltage occurring between the collector and the emitter of the switching transistor Q1;

$I_{B1}$ Base current of the switching transistor Q1;

$I_{N1}$ Current which flows from collector of the switching transistor Q1 to the output terminal 2 through the main winding N1 of the choke coil T;

$E_{N2}$ Terminal voltage occurring at the feedback winding N2 of the choke coil T and which is positive when the capacitor C3 is at a higher potential;

$V_{OUT}$ Voltage derived from the output terminal 2;

$V_{B6}$ Voltage applied to the base of the transistor Q6 voltage $V_{IN}$ is applied to the input terminal 1 at a time point $t_0$, then the transistor Q4 is rendered operative, and thus the base of the transistor Q5 is positively biased so that the transistor Q5 is turned on. Thereupon, forward base current $I_{B1}$ begins to flow in the base of the switching transistor Q1 so that the switching transistor Q1 is turned on.

During time period from the time point $t_0$ to $t_1$, the switching transistor Q1 remains turned on so that the current $I_{N1}$ which increases linearly with time is caused to flow through the main winding N1 of the choke coil T. This current $I_{N1}$ is charged at the smoothing capacitor C2 so as to increase output voltage $V_{OUT}$ occurring at the output terminal 2. The increase in the current $I_{N1}$ results in negative voltage $E_{N2}$ being generated at the feedback winding N2 of the choke coil T.

The base current $I_{B1}$ of the switching transistor Q1 is also caused to flow in the feedback circuit 4 because of the voltage $E_{N2}$, and becomes equal to a current value resulting from a combination of the current $I_{N2}$ flowing through the feedback winding N2 and the collector current $I_{C5}$ of the transistor Q5.

The current $I_{C5}$ is caused to decrease gradually due to the fact that the increase in the output voltage $V_{OUT}$ results in collector current $I_{C6}$ of transistor Q6 being increased. Thus, there is a tendency that the current $I_{B1}$ decreases during the time period from the time point $t_0$ to the time point $t_1$.

Immediately prior to the time point $t_1$, the current $I_{N1}$ flowing through the collector of the switching transistor Q1 and the main winding N1 of the choke coil T is increased up to and saturated at a level equal to the forward base current $I_{B1}$ multiplied by the current amplification factor $h_{EF1}$ of the first switching transistor Q1, i.e., $(h_{FE1} \times I_{B1})$.

When the current $I_{N1}$ becomes saturated and thus no current variations occur, the voltage $E_{N2}$ generated at the feedback winding N2 of the choke coil T is deprived of electromotive force, and the base current $I_{B1}$ of the switching transistor Q1 is decreased by the amount of the proportion of the current which was caused to flow in the feedback circuit 4 because of the voltage $E_{N2}$. Obviously, the decrease in the base current $I_{B1}$ decreases the current $I_{N1}$ flowing through the collector of the switching transistor Q1 and the main winding N1 of the choke coil T.

The decrease in the current $I_{N1}$ causes the counter-electromotive force $E_{N2}$ to be generated in the feedback winding N2, which assumes a positive voltage value as shown in FIG. 9. The voltage $E_{N2}$ having the positive voltage value provides a reverse bias between the base and the emitter of the switching transistor Q1 through the feedback circuit 4, thus causing the base current $I_{B1}$ to further decreased, while at the same time the current $I_{N1}$ is decreased.

The decrease in the base current $I_{B1}$, the decrease in the current $I_{N1}$, and the generation of the voltage $E_{N2}$ are caused to occur in the form of chain reaction, so that the switching transistor Q1 is turned off rapidly.

Charges accumulated at the base region of the switching transistor Q1 when the latter is conducting, are discharged due to the voltage $E_{N2}$ so that spike-like base current $I_{B1}$ is caused from the base toward the emitter of the switching transistor Q1.

The discharging of the charges accumulated at the base region causes the switching transistor Q1 to be completely turned off at the time point $t_1$. The operation after the current $I_{N1}$ becomes saturated until the switching transistor Q1 is turned off, is performed in a very short time; thus it can be considered that the saturation of the current $I_{N1}$ and the turning-off of the switching transistor Q1 are effected substantially at the same time.

During the time period from the time point $t_1$ to a time point $t_2$ in FIG. 9, even after the switching transistor Q1 is turned off, the current $I_{N1}$ resulting from counterelectromotive force is permitted to continue flowing in the main winding N1 of the choke coil T through the diode D1 and decreases linearly with time. As the current $I_{N1}$ is decreased, the output voltage $V_{OUT}$, voltage $V_{B6}$, and current $I_{C6}$ are decreased.

At this point, the counterelectromotive voltage $E_{N2}$ provides a reverse bias between the base and the emitter of the switching transistor Q1, while at the same time, capacitor C3 of the feedback circuit 4 is charged by current $I_{N2}$ which is caused to flow in the feedback winding N2 because of the counterelectromotive voltage $E_{N2}$.

At the time point $t_2$, the charging of the capacitor C3 is completed, and thereupon, the voltage providing the reverse bias between the base and the emitter of the switching transistor Q1 is eliminated. At this point, the base of the transistor Q5 is always in a positively biased state, so that the switching transistor Q1 is turned of again.

During time period from $t_2$ to time point $t_3$ when the switching transistor Q1 is turned on, operation similar to that performed during the time period from the time point $t_0$ when the voltage $V_{IN}$ was applied to the time point $t_1$ when the switching transistor Q1 is turned off, is performed, and the time point $t_3$ when the switching transistor Q1 is again turned off, is reached.

The above-described operation is repeated so that self-oscillation is generated.

Description will next be made of operation for stabilizing the output voltage of the conventional DC-DC converter shown in FIG. 8.

As a result of the self-oscillation, the output voltage $V_{OUT}$ builds up and voltage $V_{B6}$ also builds up, so that transistor Q6 is positively biased at the base thereof and thereby turned on. Differential operation is performed by the transistors Q5 and Q6; thus, when the transistor Q6 is turned on and current $I_{C6}$ is caused to flow in the collector thereof, the collector current $I_{C5}$ of the transistor Q5 is decreased.

If the output voltage $V_{OUT}$ exceeds a predetermined level, then the current $I_{C5}$ is decreased, and the current $I_{B1}$ is also decreased. Thus, since the current $I_{N1}$ is of a low value and flows for only a short time, operation for restraining the magnitude of the output voltage is performed.

On the other hand, if the output voltage $V_{OUT}$ becomes lower than the predetermined level, then the collector current $I_{C5}$ of the transistor Q5, i.e., the base current $I_{B1}$ of the switching transistor Q1 is increased.

Immediately after the current $I_{N1}$ flowing in the main winding N1 has become equal to $(h_{FE1} \times I_{B1})$, the switching transistor Q1 is turned off; thus, if the current $I_{B1}$ is high, the current $I_{N1}$ is permitted to continue flowing until it becomes high, thereby increasing the magnitude of the output voltage $V_{OUT}$.

As mentioned above, self-oscillation type DC-DC converter is mainly employed as low output capacity, low cost power source.

The circuit of FIG. 8 is capable of providing self-oscillation and constant voltage output by virtue of its simplified circuit arrangement, and arranged such that the choke coil includes, besides the main winding, the feedback winding for achieving oscillating operation. Hence, the conventional circuit arrangement is disadvantageous in that it is required that the plural windings be used even if the number of output is single (one channel), thus increasing the cost and size of the power source.

SUMMARY OF THE INVENTION

Accordingly, it is an object of the present invention to provide an inexpensive, small-size, self-oscillation type DC-DC converter which is arranged to generate self-oscillation by using a single-winding inductance element as choke coil so that complication of the circuit arrangement and design procedures can be avoided.

According to an aspect of the present invention, there is provided a self-oscillation type DC-DC converter comprising a first switching element; a second switching element having a current input terminal thereof connected to that of the first switching element, the second switching element having a current output terminal connected to a control terminal of the first switching element; a first resistor connected between the control terminal of the first switching element and the ground; a second resistor through which a control terminal of the second switching element is connected to the control terminal of the first switching element; and a feedback circuit connected between the current output terminal of the first switching element and the control terminal of the second switching element.

As will be appreciated, in the self-oscillation type DC-DC converter according to the present invention, the current input terminal and current output terminal of the second switching element are connected between the current input terminal and control terminal of the first switching element so that the first switching element is turned on and off through the turning-on and off of the second switching element. The turning-on of the second switching element is effected by applying counterelectromotive force generated at the choke coil to the control terminal of the second switching element through the feedback circuit, and the turning-off of the second switching transistor is effected by the control circuit blocking a current flowing to the control terminal of the second switching element on the basis of the output voltage.

With the circuit according to the present invention, self-oscillation can be generated despite the fact that a single-winding inductance element is used as choke coil, and no feedback winding is required, so that the cost and size of the DC-DC converter can be reduced.

A further advantage is such that circuit designing is facilitated in that peak value of the current flowing through the choke coil remains substantially constant and can easily be set by means of the first switching element and the resistor connected to the control terminal thereof.

Other objects, features and advantages of the present invention will become apparent from the ensuing description taken in conjunction with the accompanying drawings.

DESCRIPTION OF THE PREFERRED EMBODIMENTS

The DC-DC converter using a choke coil comprising a single-winding inductance element according to an embodiment of the present invention will now be described with reference to the circuit diagram of FIG. 1, wherein parts corresponding to those of FIG. 8 are indicated by like reference symbols.

A first switching transistor Q1 of the PNP type has the emitter thereof connected to an input terminal 1 and the collector thereof coupled to an output terminal 2 through a choke coil L1. A capacitor C1 is connected between the input terminal 1 and the ground. A second switching transistor Q2 of the PNP type has the emitter thereof connected to the emitter of the first switching transistor Q1 and the collector thereof connected to the base of the first switching transistor Q1.

The base of the second switching transistor Q2 is connected to the base of the first switching transistor Q1 through a resistor R2. The point where the base of the first switching transistor Q1, one end of the resistor R2, and the collector of the second transistor Q2 are connected together, is grounded through a resistor R1.

A feedback circuit 4 comprising a series circuit of a resistor R3 and capacitor C3 is connected between the collector of the first switching transistor Q1 and the base of the second switching transistor Q2. The feedback circuit 4 has the capacitor C3 connected to the collector of the first switching transistor Q1.

A diode D1 is connected between the collector of the first switching transistor Q1 and the ground, with the anode thereof being grounded. A smoothing capacitor C2 is connected between the output terminal 2 and the ground. Connected between the output terminal 2 and the ground are a series circuit of resistors R5 and R6 and a series circuit of a Zener diode DZ1 and resistor R3, with the anode of the diode being grounded. An NPN transistor Q3 has the base thereof connected to connection point between resistors R5 and R6 and the emitter thereof connected to connection point between the resistor R3 and the cathode of the Zener diode DZ1. The collector of the transistor Q3 is connected to second switching transistor Q2 side end of the resistor R3 of the feedback circuit 4 through resistor R4.

A control circuit 3 is constituted by the above-mentioned resistors R3, R4, R5 and R6, the transistor Q3, and the Zener diode DZ1.

With the above-described circuit arrangement, it is possible to generate self-oscillation despite the fact that the choke coil L1 includes no feedback winding. The operation of self-oscillation will now be described with reference to FIG. 2 illustrating current and voltage waveforms which occur at various points in the circuit shown in FIG. 2.

Figure 2:
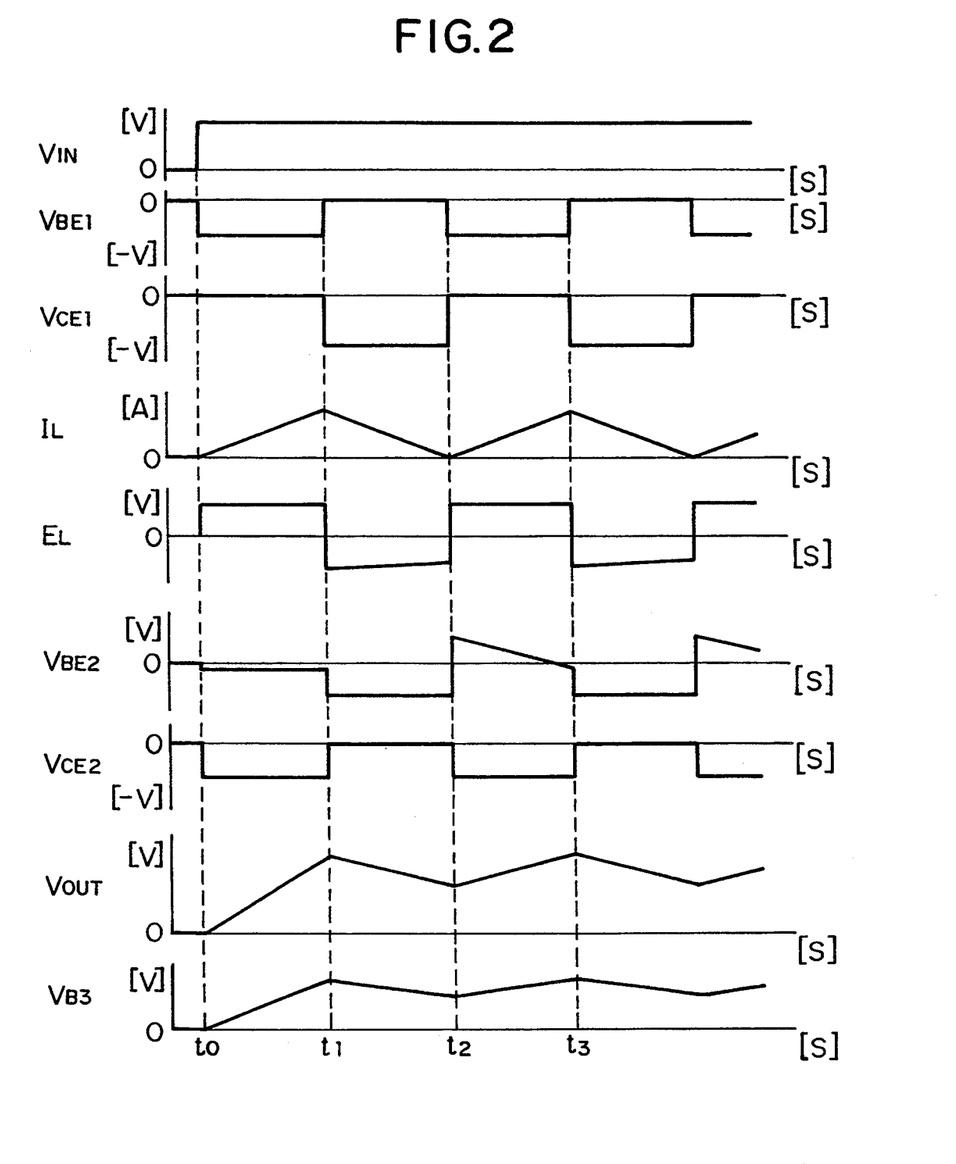
FIG. 2 illustrates current and voltage waveforms which occur at various points in the circuit of FIG. 1.

In FIG. 2, the respective reference symbols are as follows:

$V_{IN}$ Voltage inputted to the input terminal 1 of the circuit;

$V_{BE1}$ Forward bias voltage applied between the base and the emitter of the first switching transistor Q1;

$V_{CE1}$ Voltage between the collector and the emitter of the first switching transistor Q1;

$I_L$ Current flowing through the choke coil L1;

$E_L$ Voltage across the choke coil L1, which is positive when the output terminal 2 side is at a lower potential;

$V_{BE2}$ Bias voltage applied between the base and the emitter of the second switching transistor Q2;

$V_{CE2}$ Voltage between the collector and the emitter of the second switching transistor Q2;

$V_{OUT}$ Voltage outputted from the output terminal 2;

$V_{B3}$ Voltage inputted to the base of the transistor Q3

If voltage $V_{IN}$ is applied to the input terminal 1 at a given time point $t_0$, then the first switching transistor Q1 is forwardly biased between the base and the emitter thereof through the resistor R1 so that the first switching transistor Q1 is turned on.

At this point, the forward bias voltage $V_{BE1}$ between the base and the emitter of the first switching transistor Q1 is applied between the base and the emitter of the second switching transistor Q2 through the resistor R2; thus the forward bias voltage $V_{BE2}$ is not enough to enable the second switching transistor Q2 to be turned on, so that the second switching transistor Q2 remains non-conductive.

Thus, during time period from time point $t_0$ to time point $t_1$ shown in FIG. 2, the switching transistor Q1 is turned on so that current $I_L$ which increases linearly with time is caused to flow through the choke coil L1. The smoothing capacitor C2 is charged with the current $I_L$ so that the voltage $V_{OUT}$ appearing at the output terminal 2 is caused to build up gradually.

Immediately prior to the time point $t_1$, the current flowing through the collector of the first switching transistor Q1 and the choke coil L1 is increased up to and saturated at a level equal to the current amplification factor $h_{FE1}$ multiplied by the forward base current $I_{B1}$ determined by the resistor R1 ($h_{FE1} \times I_{B1}$).

When the current $I_L$ becomes saturated so that current variations no longer occur, no voltage drop occurs at the choke coil L1; thus, just prior to the time point $t_1$, the voltage $V_{CE1}$ between the collector and the emitter of the first switching transistor Q1 builds up.

Thus, the current $I_L$ can no longer retain the value of ($h_{FE1} \times I_{B1}$) and decreases gradually. The decrease in the current $I_L$ results in a counterelectromotive force being generated across the choke coil L1 so that the voltage $E_L$ becomes a negative voltage as shown in FIG. 2. The voltage $E_L$ acts to draw in the base current $I_{B2}$ of the second switching transistor Q2 through the feedback circuit 4, thereby turning on the second switching transistor Q2.

The turning-on of the second switching transistor Q2 decreases the voltage $V_{BE1}$ by which the first switching transistor Q1 is forwardly biased between the base and the emitter thereof; as a result, the first switching transistor Q1 becomes unable to maintain the on state and thus is turned off at the time point $t_1$.

After the above-mentioned current $I_L$ has become saturated, the first switching transistor Q1 is turned off in a very short time; thus, it can be considered that the saturation of the current $I_L$ and the turning-off of the first switching transistor Q1 occur substantially at the same time.

During time period from the time point $t_1$ to time point $t_2$ shown in FIG. 2, voltage $E_L$ resulting from counterelectromotive force is generated in the choke coil L1 due to the turning-off of the first switching transistor Q1, so that the diode D1 is forwardly biased with the voltage $E_L$ and thus power is supplied to a load.

The voltage $E_L$ is caused to decrease gradually by supplying power to the load, and consequently the current $I_L$ flowing through the choke coil L1 is also decreased linearly with time.

As the voltage $E_L$ resulting from counterelectromotive force is decreased, the second switching transistor Q2 becomes unable to retain the forwardly biased state and thus is turned off at the time point $t_2$.

Further, at the time point $t_2$, as a result of the second switching transistor Q2 being turned off, the forward bias voltage between the base and the emitter of the first switching transistor Q1 is increased so that forward current $I_{B1}$ begins flowing therethrough, thereby turning on the first switching transistor Q1.

During time period from the time point $t_2$ to time point $t_3$ shown in FIG. 2, during which the first switching transistor Q1 is turned on, operation similar to that during the time period from the time point $t_0$ when the voltage $V_{IN}$ was applied to the time point $t_1$ when the first switching transistor Q1 is turned on, is performed, and the time point $t_3$ when the first switching transistor Q1 is again turned off, is reached.

Self-oscillation is achieved by repeating the above-described operation.

Figure 1:
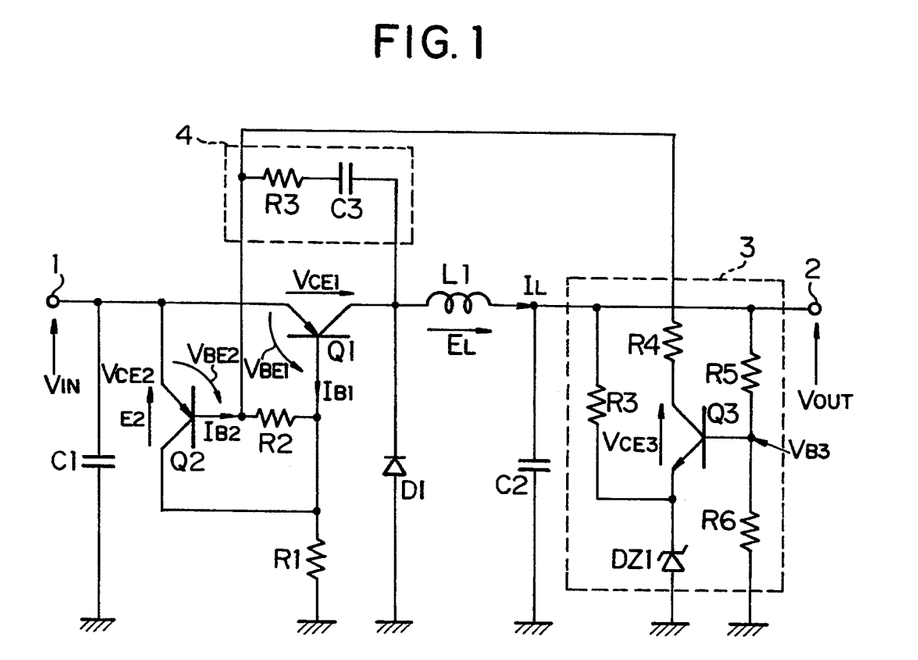
FIG. 1 is a circuit diagram showing the self-oscillation type DC-DC converter according to an embodiment of the present invention.

With the present circuit of FIG. 1, control for stabilizing the output voltage is made by the transistor Q3 of control circuit 3.

When the output voltage $V_{OUT}$ is lower than the predetermined level, for example, the counterelectromotive force generated at the choke coil L1 is decreased so that the second switching transistor Q2 becomes unable to retain the forwardly biased state and thereupon the second switching transistor Q2 is turned off while the first switching transistor Q1 is turned on.

On the other hand, when the output voltage $V_{OUT}$ is higher than the predetermined level, the voltage $V_{B3}$ also becomes high; and when the voltage $V_{B3}$ becomes higher than a sum of the forward voltage of the Zener diode DZ1 and the forward voltage between the base and the emitter of the transistor Q3, the transistor Q3 is turned on so that the voltage $V_{CE3}$ between the collector and the emitter of the transistor Q3 is decreased.

Thus, despite the decrease in the counterelectromotive force generated at the choke coil L1, the base current $I_{B2}$ of the second switching transistor Q2 is permitted to flow in the transistor Q3 through the resistor R4 so that the transistor Q3 keeps the second switching transistor Q2 in the forwardly biased state.

If the output voltage $V_{OUT}$ is decreased so that the voltage $V_{B3}$ inputted to the base of the transistor Q3 is decreased, then the voltage $V_{CE3}$ between the collector and the emitter of the transistor Q3 is caused to build up and then becomes unable to keep the second switching transistor Q2 at the forwardly biased state, so that the second switching transistor Q2 is turned off, while the first switching transistor Q1 is turned on.

Thus, when the output voltage $V_{OUT}$ is low, the second switching transistor Q2 is turned off as the counterelectromotive force at the choke coil L1 is decreased; and the time period during which the first switching transistor Q1 is non-conductive, turns out to be substantially short so that the output voltage $V_{OUT}$ is increased.

On the other hand, when the output voltage $V_{OUT}$ is high, the second switching transistor Q2 is turned off as the voltage $V_{CE3}$ between the collector and the emitter of the transistor Q3 of the control circuit 3 builds up; and the time period during which the first switching transistor Q1 is non-conductive, turns out to be substantially long so that the output voltage $V_{OUT}$ is decreased. In this way, the voltage regulating operation is performed.

As will be appreciated from the foregoing discussion, with the present circuit shown in FIG. 1 wherein a single-winding inductance element is used as choke coil, self-oscillating operation as well as voltage regulating operation can be performed. Furthermore, according to the present invention, the choke coils require no feedback winding for self-oscillation; hence, the manufacturing cost and size of DC-DC converter can be reduced.

Because of the fact that the time period during which the first transistor Q1 is non-conductive is varied, the switching frequency tends to be changed as in the conventional self-oscillation type DC-DC converter: However, peak value of current flowing through the choke coil is determined to have a substantially constant value by the current amplification factor $h_{FE1}$ and the resistance value for the resistor R1; hence, it is not necessary to choose circuit elements taking into account of variations in the peak value of the current, and it is easier to design the circuit.

Figure 3:
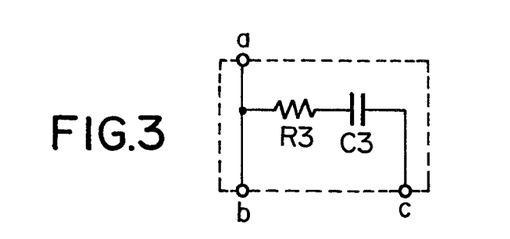
FIG. 3 illustrates an example of arrangement of basic feedback circuit.

Referring to FIG. 3, there is shown the feedback circuit 4 wherein terminal a is connected to one end of the resistor R4 of the control circuit 3; terminal b is connected to the base of the second switching transistor Q2; and terminal c is connected to the collector of the first switching transistor Q1.

The function of the feedback circuit 4 is such that normally DC current is blocked; and when counterelectromotive force is generated at the choke coil L1 the forward base current $I_{B2}$ of the second switching transistor Q2 is permitted to flow. Alternative circuit arrangements such as shown in FIGS. 4 to 7 may also be possible as embodiments of the present invention, besides that shown in FIG. 3.

Figure 4:
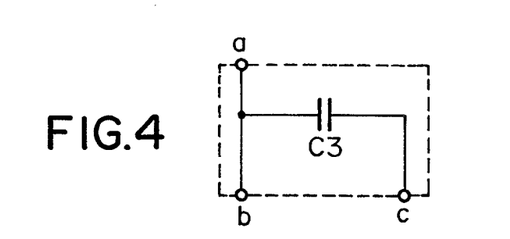
FIG. 4 illustrates another example of arrangement of such feedback circuit.

When counterelectromotive force is generated at the choke coil L1, the forward base current $I_{B2}$ of the second switching transistor Q2 is permitted to flow in the choke coil L1 through the feedback circuit 4. At this point, the second switching transistor Q2 can be turned on by the time when charging of the capacitor C3 is completed; thus, if sudden flow of the forward base current $I_{B2}$ has no detrimental effect on the circuit, then the resistance value for the resistor R3 may be zero. In such a case, the feedback circuit may be arranged as shown in FIG. 4.

Figure 5:
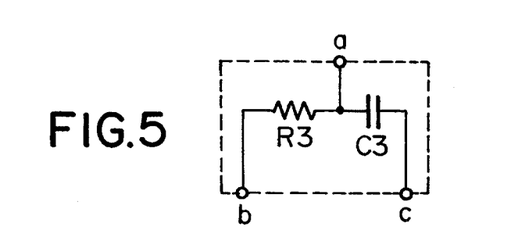
FIG. 5 illustrates a still another example of arrangement of such feedback circuit.

To permit the entire base current $I_{B2}$ of the second switching transistor to flow the control circuit 3 after charging of the capacitor C3 has been completed, the terminal a connected to the control circuit 3 may be led out of a portion closer to the second switching transistor Q2 than the capacitor C3. To this end, FIG. 5 shows a circuit arrangement for the feedback circuit wherein the terminal a is led out of the connection point between the resistor R3 and the capacitor C3.

Figure 6:
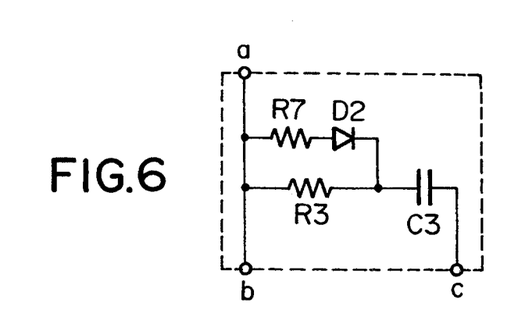
FIG. 6 illustrates an example of arrangement of feedback circuit including a circuit for speeding up the operation of a second switching transistor.

FIG. 6 shows a circuit arrangement for the feedback circuit 4 wherein a series circuit of a resistor R7 and diode D2 is connected in parallel with the resistor R3 of the feedback circuit 4, with the cathode of the diode D2 being connected to the connection point between the resistor R3 and the capacitor C3, thereby speeding up the operation of the second switching transistor Q2.

Figure 7:
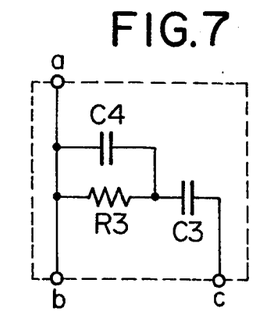
FIG. 7 illustrates an example of arrangement of feedback circuit including another circuit for speeding up the operation of a second switching transistor.

FIG. 7 illustrates a circuit arrangement for the feedback circuit 4 wherein a speed-up capacitor C4 is connected in parallel with the resistor R3, thereby speeding up the operation of the second switching transistor Q2 as in FIG. 6.

Although in FIGS. 6 and 7, the terminal a is led out of the terminal b side end of the resistor R3, it is also possible that the terminal a may be led out of the connection point between the resistor R3 and the capacitor C3.

While the present invention has been illustrated and described with respect to specific embodiments thereof, it is to be understood that the present invention is by no means limited thereto but encompasses all changes and modifications which will become within the scope of the appended claims.

I claim:

1. A non-insulated, self-oscillation type DC-DC converter having DC voltage inputted therein, and a first switching element for turning on and off the inputted DC voltage so that stabilized DC output voltage is applied to a load through a smoothing circuit comprising at least one diode, a choke coil, and a smoothing capacitor, said converter comprising:
   a second switching element of a same junction type as said first switching element, said first switching element having a current input terminal connected to a current input terminal of said second switching element,
   said first switching element having a control terminal that is connected to a current output terminal of said second switching element;
   a first resistor connected between said control terminal of said first switching element and ground;
   a second resistor; said second switching element having a control terminal that is connected by said second resistor to said control terminal of said first switching element; and
   a feedback circuit connected between a current output terminal of said first switching element and said control terminal of said second switching element.

2. A self-oscillation type DC-DC converter according to claim 1, further comprising a control circuit for stabilizing output voltage; an output terminal of said control circuit being connected to the control terminal of said second switching element so that a control current of said second switching element is controlled in accordance with the output voltage; and off-time of said first switching element is changed, thereby keeping the output voltage substantially constant.

3. A self-oscillation type DC-DC converter according to claim 2, wherein said feedback circuit comprises a resistor and a capacitor.

4. A self-oscillation type DC-DC converter according to claim 2, wherein the capacitor of said feedback circuit is connected to the current output terminal of said first switching element; and a circuit for speeding up the operation of said second switching element is connected in parallel with the resistor of said feedback circuit.

5. A self-oscillation type DC-DC converter according to claim 1, further comprising a control circuit for stabilizing output voltage; an output terminal of said control circuit being connected to the control terminal of said second switching element through said feedback circuit so that a control current of said second switching element is controlled in accordance with the output voltage; and off-time of said first switching element is changed, thereby keeping the output voltage substantially constant.

6. A self-oscillation type DC-DC converter according to claim 5, wherein said feedback circuit comprises a resistor and a capacitor.

7. A self-oscillation type DC-DC converter according to claim 1, wherein said feedback circuit comprises a resistor and a capacitor.

8. A self-oscillation type DC-DC converter according to claim 7, wherein the capacitor of said feedback circuit is connected to the current output terminal of said first switching element; and a circuit for speeding up the operation of said second switching element is connected in parallel with the resistor of said feedback circuit.

9. A self-oscillation type DC-DC converter according to claim 7, wherein the capacitor of said feedback circuit is connected to the current output terminal of said first switching element; and a circuit for speeding up the operation of said second switching element is connected in parallel with the resistor of said feedback circuit.

* * * * *